United States Patent Office 3,355,807
Patented Dec. 5, 1967

3,355,807
PHOTOGRAMMETRIC APPARATUS FOR STEREO-SCOPIC PLOTTING OF PHOTOGRAMS
Horst Schoeler, Jena, Germany, and Franz Manek, deceased, late of Jena, Germany, by Eva Manek, executrix, Berlin, Germany, assignors to VEB Carl Zeiss Jena, Jena-Gera, Germany
Filed May 25, 1964, Ser. No. 371,170
3 Claims. (Cl. 33—1)

ABSTRACT OF THE DISCLOSURE

The invention concerns stereophotogrammetric apparatus having analogous computers which comprise levers and guideways and which for plotting photograms in the general case of stereophotogrammetry make use of the projections of a collimating ray in two planes and transform the coordinates measured in the photograms into image coordinates that correspond to the normal case in stereophotogrammetry, the apparatus subsequently transforming these image coordinates into object coordinates.

---

Figure 1:
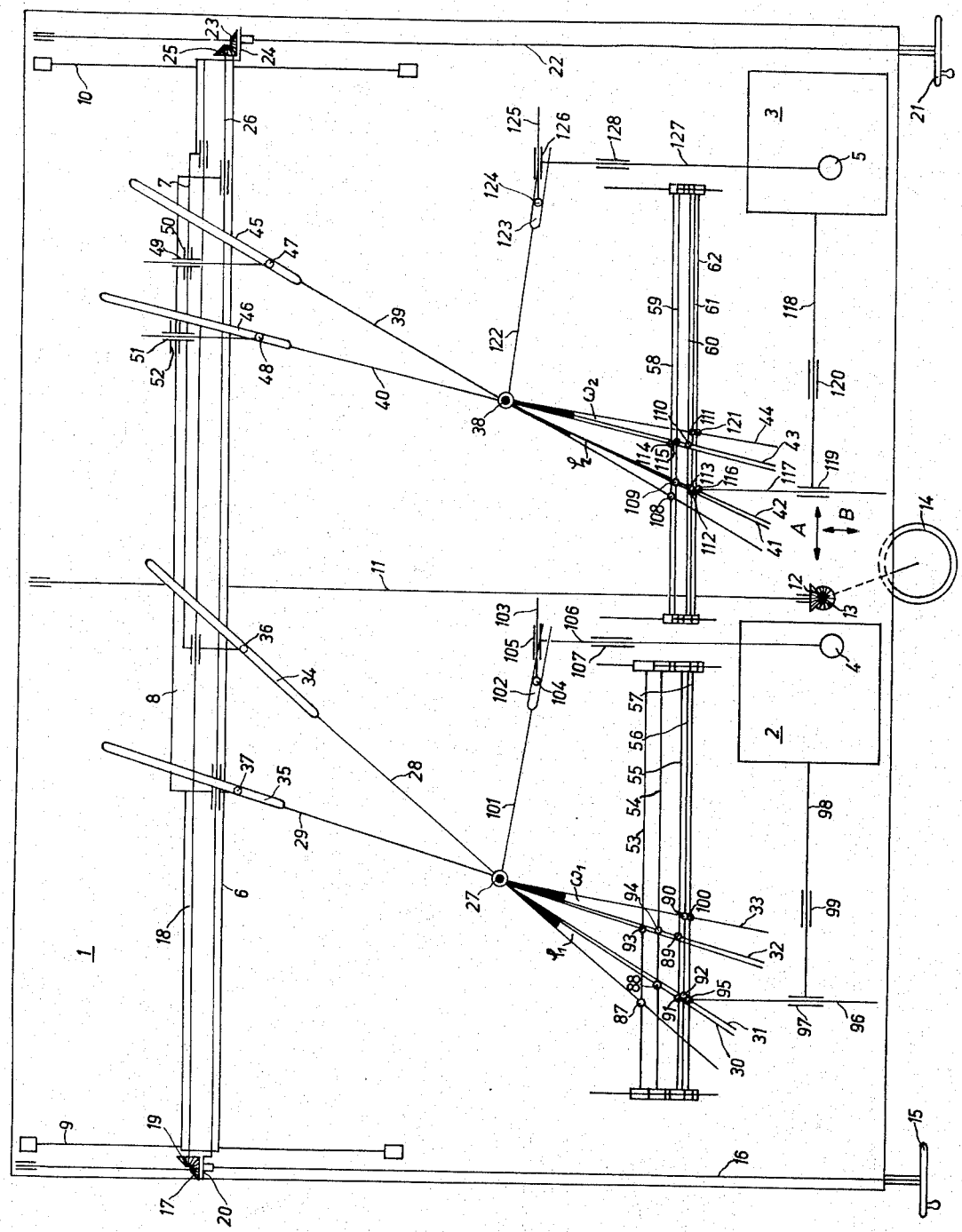

This invention relates to a photogrammetric apparatus for stereoscopic plotting of photograms.

Photogrammetric, particularly aero-photogrammetric, plotting of medium and small-scale maps relies to an ever increasing extend on surveying cameras with wide-angle and superwide-angle lenses. The inherently short focal lengths of such lenses keep the flying height within reasonable limits even if the image-scale numbers are high, and they thus offer the advantage of very considerable independence of haziness in the air. The plotting itself promises an increase in the accuracy of the height measures because cameras with superwide-angle lenses require a far greater base ratio than do cameras equipped with standard and wide-angle lenses. Moreover, vertical photograms taken by cameras with superwide-angle lenses are superior both instrumentally and methodically to photograms taken by other surveying-camera units, for instance twin cameras.

Photogrammetric plotting of photograms taken by wide-angle and superwide-angle cameras is for constructional reasons not or not always feasible with the known universal plotting apparatus. For this reason special plotting apparatus have been constructed which solve the basic equations of stereophotogrammetry exactly or approximately and in which photograms taken with small nadir distance and definite focal length are plotted in the original or a transformed size. Apart from only approximate solution and a possibly necessary transformation, there is the further disadvantage of the effective range of such plotting apparatus being restricted to one or two definite focal lengths.

Apart altogether from methodical and instrumental errors, it is to be considered that the above-mentioned plotting apparatus work with congruent ray beams, which means that the taking and the plotting beam are equal to each other. In a further known universal plotting apparatus, however, the plotting beam realized by means of spatial rods is dissimilar to the taking beam and the stereo model is not therefore rigorously similar to the landscape. By intentionally not maintaining but usually reducing the focal length and, accordingly, the angular aperture of the taking beam, the stereo model is definitely increased in height and plotting is affinitive. The increase in height depends on the affinity factor, that is to say on the ratio the focal lengths of taking and plotting bear to one another. This affinity plotting apparatus permits plotting of photograms taken at any focal length and inclination, but each photogram must undergo a displacement according to the change in the position of its principal point, a so-called decentration, which requires being defined empirically and depends on the nadir distance at the taking of the photogram as well as on a constant of the instrument. The decentration of each photogram is adjusted by means of a very complicated mechanism in the orientation process and must in the interest of sufficient accuracy be repeated several times. Apart from the complication of such manipulations, due in particular to empiricism in defining the generally usual inclination components $\varphi$ and $\omega$ of the nadir distance and to the necessity of looking up the adjustment elements for the mechanism in a table expressly made up for this purpose, the mechanism has an undesired bearing on the construction and accuracy of the plotting apparatus.

The present invention aims at obviating the foregoing disadvantages and to this end consists in a universal photogrammetric apparatus for stereoscopic plotting of photograms taken from the air with any desired focal length and nadir distance, in which these photograms are oriented and affinity plotting is effected without unwieldy spatially acting correction mechanisms, simply by using and setting the hitherto usual orientation elements, viz. the longitudinal inclination $\varphi$, the transverse inclination $\omega$ and the camera constant $c_K$, and which allows affinity plotting to be made regardless of the magnitude of the affinity factor, that is to say even with the affinity factor "1" corresponding to plotting with congruent beams.

To this end the present invention is based on the idea underlying an apparatus for the stereoscopic plotting of photograms in two sectional planes at right angles to each other, such as are used in the general case of stereophotogrammetry, in which each photogram has associated to it two double levers corresponding respectively to the projection beams in the two sectional planes.

Photogrammetric apparatus for stereoscopic plotting of photograms separated into ground plan and elevation are known as stereo-autographs, but they do not lend themselves to affinitive plotting. This is due to constructional reasons and to the plotting method peculiar to nearly all of them, namely direct determination of the space coordinates from the image coordinates.

The invention achieves its object by correlating in the image space of the stereo-plotting apparatus to each double lever a mechanical and/or electrical means which so interconnects the double levers of the respective photogram that both photograms are automatically transformed to photograms corresponding to the normal case in stereophotogrammetry, it being irrelevant whether the entire photogram is transformed at once or its various points are transformed successively to each other. The affinity factor is taken into consideration in the plotting method only after the transformation of the photograms to such corresponding to the normal case.

One embodiment of the apparatus according to the invention, which is similar to the known photogrammetric plotting apparatus called stereo-autographs, offers the advantages that to each double lever are correlated two auxiliary levers which are likewise rotatable about the projection centre and whereof one of those coordinated to the double lever of the one sectional plane includes with this double lever a fixed angle, and whereof those coordinated to the double lever of the other sectional plane enclose a fixed angle, that parallel to the line interconnecting the two projection centres one guide is arrested when plotting takes place and four guides are displaceable, that to each guide is pivoted one lever of each sectional plane, one of the auxiliary levers in both sectional planes being pivoted to two guides, and that the two levers of the one plane which encloses a fixed angle are at a constant distance from the projection centre pivoted to a parallel guide to which the single lever and one of the coupled auxiliary levers of the other sectional plane are so pivoted that their pivots lie in a plane at right angles to the parallel guides. If this apparatus is used for plotting terrestrically taken photograms, the one sectional plane is identical with the ground plane and the other sectional plane is identical with the elevation.

For adjustment of the various focal lengths and different affinity factors, the parallel guide stationary in the plotting process is in the orientation process likewise displaceable and arrestable parallel to the line interconnecting the two projection centres.

To enable photograms being plotted regardless of longitudinal and transverse inclinations, the fixed angles formed by the interconnected levers are adjustable.

From considerations of space, those axes of rotation of two correlated double levers which correspond to one projection centre can be disposed above one another in mutual prolongation.

Apart from the completely symmetrical arrangement of the levers and guide systems correlated to the photograms, the apparatus according to the invention in comparison with similar known apparatus offers the advantage that all levers and guides are equal to each other, which is of no small importance in manufacture.

Another embodiment of the invention, likewise made up of constructional elements equal to each other, has fewer guides and levers. In this other embodiment there is correlated to each double lever a first guide which carries a slide and in a plane parallel to the planes of rotation of the double levers is rotatable about an axis corresponding to the projection centre. The said slide has a drive member which is displaceable in the said plane and engages a slider gliding along another guide. The said other guide is at right angles to the line interconnecting the projection centres and is parallel to the said plane and connected to the corresponding double lever in a plane which contains the axis of rotation and is parallel to the line interconnecting the projection centres. There are also means for transmitting the displacement of the slider on the other guide of the one double lever to the slide of the other double lever correlated to the same photogram.

The transmission of the displacement of the slider to the slide is conveniently effected by an electric follow-up control.

For adjustment of the affinity factor, the distance apart of the axis of rotation of the said first guide and the axis of rotation of the respective double lever can be varied, and for taking into consideration the longitudinal and transverse inclinations the rotations of the first guides are adjustable.

As in the first embodiment, the axes of rotation of the first guides correlated to one photogram can be so arranged as to coincide with each other, and coincidence can obtain also between the axes of rotation of the double levers. The guides, slides and sliders can be coordinated in space to the double levers in any desired manner, they may for instance be completely separate from each other, and electric transmitters may be provided in suitable manner between the other guide and the corresponding double lever.

Both embodiments offer the particular advantage that they can be coupled to a differential rectifying apparatus, so that maps can be produced regardless of landscape inclination, which is due to the possibility of getting photograms taken in the general case of stereophotogrammetry transformed to normal-case photograms point by point. The second embodiment of the invention makes it feasible to obtain for each point at the same time the effective focal length of the corresponding vertical photogram, which offers the advantage of still further possibilities of coupling with a differential rectifier.

Figure 2:
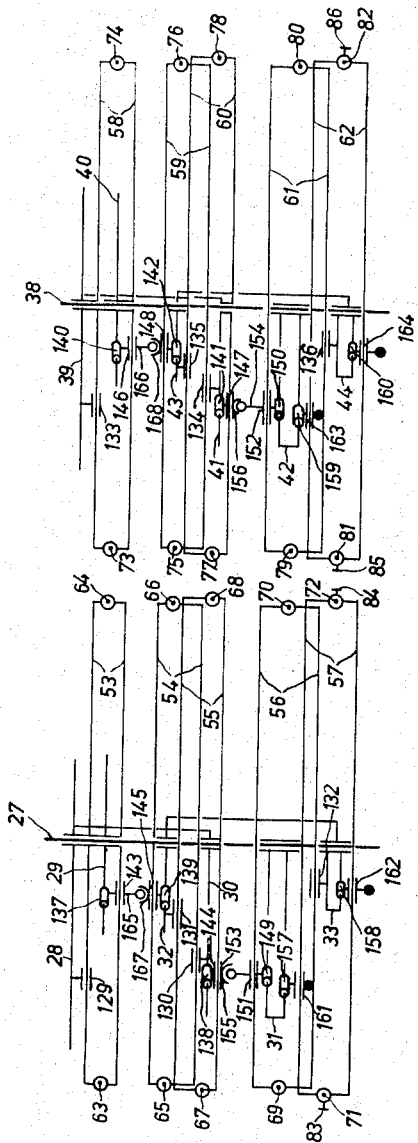
Figure 4:
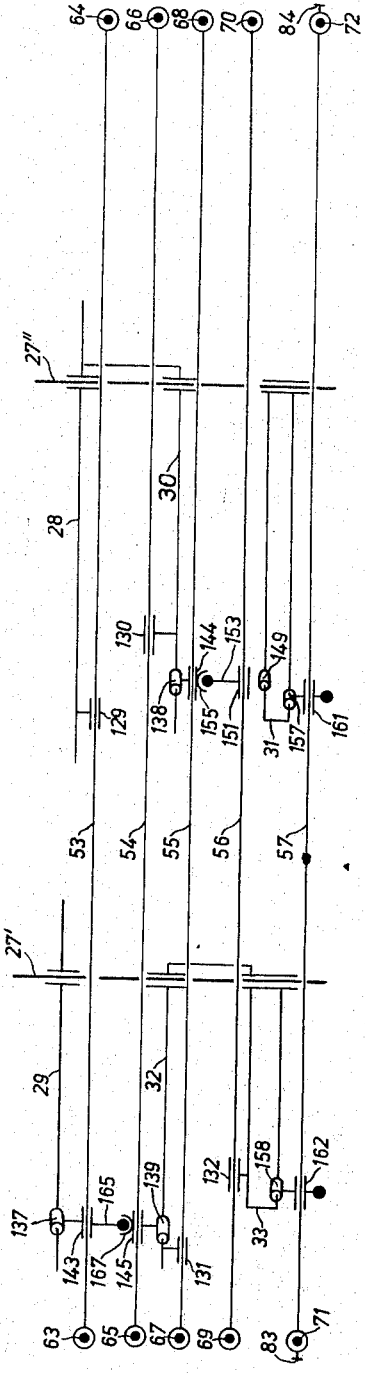
Figure 3:
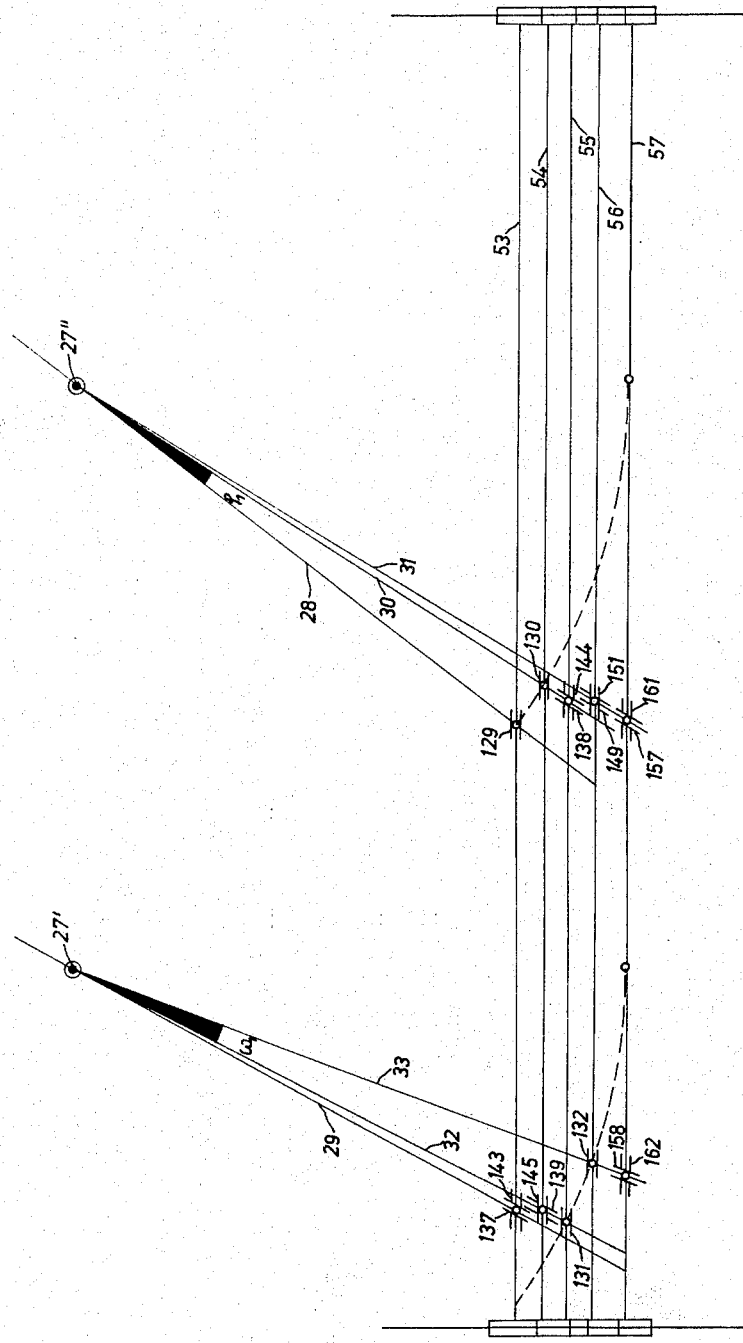
Figure 5:
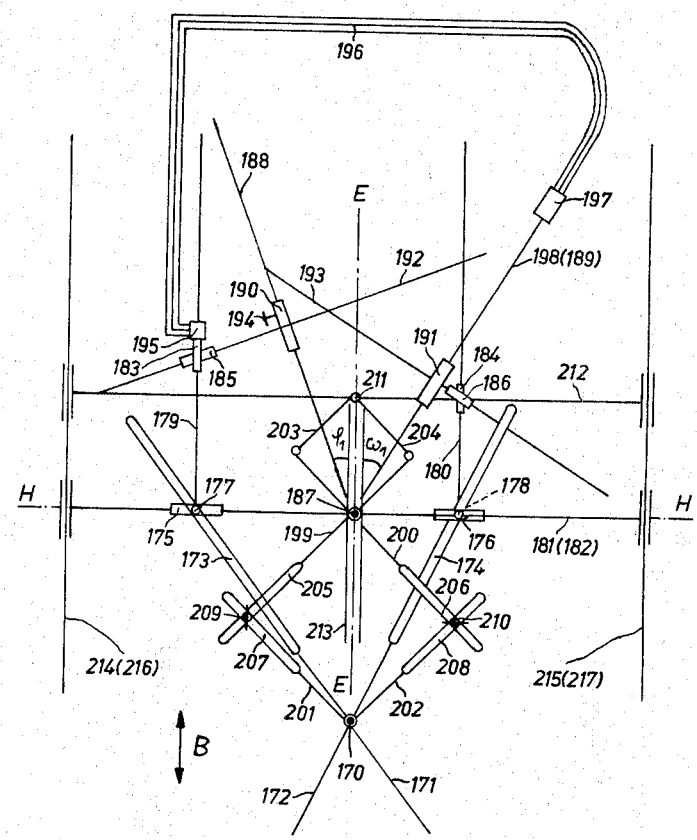
Figure 6:
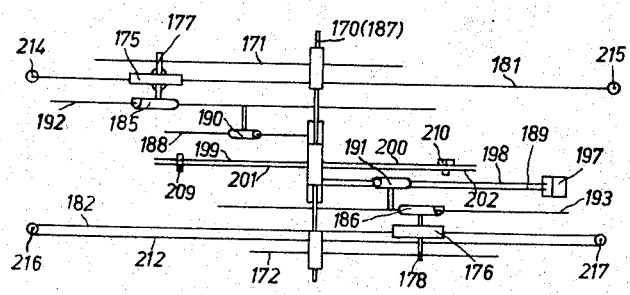

In order that the invention may be more readily understood, reference is made to the accompanying drawings, which illustrate diagrammatically and by way of example two embodiments in connection therewith, and in which FIGS. 1 and 2 show the one embodiment in plan view,
FIGS. 3 and 4 show this one embodiment in elevation, and
FIGS. 5 and 6 show in plan view and in elevation, respectively, those parts of the other embodiment which correspond to the invention.

On a base plate 1 (FIG. 1) two photograms 2 and 3 together with their carrier (not shown) are displaceable in breadth direction A, and two lenses 4 and 5 of a binocular viewing microscope (not shown) are displaceable in depth direction B. The base plate 1 supports in the model space a system of cross-slides comprising a depth slide 6, a breadth slide 7 and, between these two, a height slide 8. The depth slide 6, for setting in depth direction B along guides 9 and 10, is displaceable by means of a spindle 11 which is mounted on the base plate 1 and operated by a pair of bevel gears 12, 13 and a foot plate 14. On the depth slide 6, along guides (not shown) disposed above one another, the breadth slide 7 and the height slide 8 are displaceable in breadth direction A. Displacement of the breadth slide 7, topmost on depth slide 6, is effected by means of a handwheel 15 over a grooved shaft 16 mounted on the base plate 1, a bevel gear 17 displaceable along the shaft 16, and a bevel gear 19 rigidly keyed to a spindle 18 which engages the breadth slide 7 and is mounted on the depth slide 6. The two bevel gears 17 and 19 are held in constant engagement with each other by means of a drive member 20 fast with the depth slide 6. Displacement of the height slide 8 is effected by means of a handwheel 21 fast with a grooved shaft 22 which is mounted on the base plate 1 and along which a bevel gear 23 is displaceable by means of a drive member 24 fast with the depth slide 6. The bevel gear 23 is in mesh with a bevel gear 25 on a spindle 26 which is mounted on the depth slide 6 and engages the height slide 8.

The foot plate 14 and handwheel 21 for actuating the depth slide 6 and the height slide 8 are interchangeable, so that either air or ground photograms can be plotted.

For maintaining the relations existing between the space coordinates of the object points and the coordinates of the corresponding points in the photograms, there are levers and parallel guides between the system of cross slides 6, 7, and 8 on the one hand and the photograms 2, 3 and the viewing microscopes represented by the lenses 4, 5 on the other hand. As illustrated in FIG. 1 to 4, each photogram and each lens has coordinated to it a system of levers and parallel guides.

About an axis 27 corresponding to the projection centre of the left photogram 2 is rotatable a lever system made up of two straight double levers 28, 29 and in the image space of four one-armed auxiliary levers 30, 31, 32, 33. The double lever 28 has at its one end a slit 34 for engagement with a drive member 36 fast with the breadth slide 7. The double lever 29 has at its one end a slit 35 for engagement with a drive member 37 fast with the height slide 8. To the double lever 28 are correlated the levers 30 and 31. The auxiliary lever 30 and the double lever 28 enclose an adjustable angle $\varphi_1$. The auxiliary levers 32 and 33 are correlated to the double lever 29 and enclose an adjustable angle $\omega_1$. To the projection centre of the photogram 3 to the right corresponds an axis of rotation 38 about which, in analogy to axis 27, two straight double levers 39 and 40 and four one-armed auxiliary levers 41, 42, 43 and 44 are rotatable. The double lever 39 has at its one end a slit 45 for engagement with a drive member 47 which for adjustment of the basis component in breadth direction is displaceable by means of guides 49 and 50 on the breadth slide 7. The double lever 40 has at its one end a slit 46 for engagement with a drive member 48 which for adjustment of the basis component in depth direction is displaceable by means of guides 51 and 52 on the height slide 8. Of the auxiliary levers 41 and 42 correlated to the double lever 39, the auxiliary lever 41 is fast with the double lever 39 at an adjustable angle $\varphi_2$. The auxiliary levers 43 and 44 correlated to the double lever 40 enclose an adjustable angle $\omega_2$.

The plane containing the axes of rotation 27 and 38 lies in the breadth direction A and is at right angles to the plane of FIG. 1.

The levers rotatable about the axis 27 are pivoted respectively to five parallel guides 53, 54, 55, 56, 57, which are completely equal to each other and in their turn superposed one above another on guides 63 to 72 (FIG. 2) and can effect movements of their own in depth direction B. The levers rotatable about the axis 38 are pivoted respectively to five parallel guides 58, 59, 60, 61, 62, which are completely equal to each other and in their turn superposed one above another on guides 73 to 82 (FIG. 2) and can effect movements of their own in depth direction B. Before plotting, the parallel guides 57 and 62 are rigidly connected by means of clamps 83, 84 and 85, 86, respectively, to the guides 71, 72 and 81, 82, the connection points being from the axes 27 and 38, at distances equal to the constant $c_K$ of the camera taking the photograms.

The pivotal points 87, 88, 89, 90 of the levers 28, 30, 32, 33 on the parallel guides 53, 54, 55, 56 lie on a cylindrical jacket about the axis 27 and the pivotal points 91, 92, 93, 94 lie in planes at right angles to the parallel guides. At the pivotal point 95 of the auxiliary lever 31 on the plane-parallel guide 57, the displacement in breadth direction A of the photogram 2 is taken up to be transmitted to the photogram 2 by means of a rod 96, which extends in depth direction B and glides in a guide 97 at the end of a rod 98 extending in breadth direction A. A guide 99 of the rod 98 is rigidly connected to the base plate 1. The pivotal point 100 of the auxiliary lever 33 on the parallel guide 57 executes the movement of the microscope lens 4 in breadth direction A. For transformation into movement in depth direction B, the auxiliary lever 33 has rigidly connected to it at right angles a lever 101 which has a slit 102 at its far end from the axis 27. The slit 102 engages a drive member 104 fast with a rod 103 which extends in breadth direction. The distance $c_K$ between the drive member 104 and the axis 27 is equal to that between the pivotal point 100 and the axis 27. The rod 103 glides in a guide 105 disposed at the one end of a rod 106 which extends in depth direction B and glides in a guide 107 fast with the base plate 1. The other end of the rod 106 holds the lens 4.

References 108, 109, 110, 111 denote respectively the pivotal points of the levers 39, 41, 43, 44 on the parallel guides 58, 59, 60, 61, these points lying on a cylinder jacket about the axis 38. References 112, 113, 114, 115 denote respectively the pivotal points of the levers 41, 42, 40, 43 on the parallel guides 60, 61, 58, 59. The displacement of the photogram 3 in breadth direction A is operated from the pivotal point 116 of the auxiliary lever 42 on the parallel guide 62 over a rod 117 extending in depth direction B and a rod 118 extending in breadth direction A, the rod 117 gliding in a guide 119 at the one end of the rod 118. The rod 118 glides in a guide 120 which is fast with the base plate 1. The other end of the rod 118 is connected to the photogram 3. The pivotal point 121 of the auxiliary lever 44 on the parallel guide 62 executes the movement of the lens 5 in breadth direction A. For transforming this movement into a movement in depth direction B, the auxiliary lever 44 is rigidly connected to a lever 122 at an angle of 90° whose apex coincides with the axis 38. The end of the lever 122 remote from the axis 38 has a slit 123 which engages a drive member 124. The drive member 124 and the pivoting point 121 are at equal distances from the axis 38. A rod 125 carrying the drive member 124 glides in breadth direction A in a guide 126 at the one end of a rod 127 which is displaceable in a guide 128 in depth direction B and holds at its other end the lens 5.

The distance of the pivotal points 87 to 90 and 108 to 111 from the axes of rotation 27 and 38, respectively, can be constant and should for reasons of accuracy be as great as possible. Also it is feasible independently of the camera constants $c_K$ of the taking camera to leave the parallel guides 57 and 62 at an unchangeable distance from the axes of rotation 27 and 38 and to effect the plotting affinitively.

The levers are pivoted to the parallel guides in the manner apparent from FIGS. 2 to 4. Sliders 129 to 132 and 133 to 136 are displaceable respectively along the guides 53 to 56 and 58 to 61. To the sliders 129 to 132 and 133 to 136 are pivoted the levers 28, 30, 32, 33 and 39, 41, 43, 44, respectively. The levers 29, 30, 32 and 40, 41, 43 carry sliders 137, 138, 139 and 140, 141, 142 pivoted to sliders 143, 144, 145 and 146, 147, 148 on the parallel guides 53, 55, 54 and 58, 60, 59. Each of the auxiliary levers 31, 33 and 42, 44 consists of an upper and a lower leg. The upper legs of the auxiliary levers 31 and 42 carry respectively sliders 149 and 150 pivoted to sliders 151 and 152. The sliders 151 and 152 are respectively displaceable along the parallel guides 55 and 60 and have drive members 153 and 154. The drive members 153 and 154 engage guides 155 and 156, respectively, which are at right angles to the parallel guides and are parallel to the base plate and fixed to the sliders 144 and 147. The lower legs of the auxiliary levers 31, 33 and 42, 44 carry respectively sliders 157, 158 and 159, 160 pivoted to sliders 161, 162 and 163, 164, which are displaceable along the fixed parallel guides 57 and 62 and at which the movement to be imparted to the photograms and lenses are taken up in the manner described. The sliders 143 and 146 have, respectively, drive members 165 and 166 which engage guides 167 and 168 parallel to the guides 155 and 156 and fixed to the sliders 145 and 148.

In the cooperation of the levers and parallel guides correlated to each photogram, the pivotal points of the levers of the one double lever, which lie on a cylinder jacket, determine the positions of the pivotal points of the levers of the other double lever, which lie in a plane at right angles to the parallel guides. This means the correction of the movement transmitted by this other double lever, which is due to the inclinations of the photogram at the exposure.

FIGS. 3 and 4 illustrate only the levers and parallel guides correlated to the left photogram. Unlike FIGS. 1 and 2, the axis of rotation is divided, and the parallel guides do not each consist of two parts one above the other, so that the double levers 28 and 29, respectively correlated to the two sectional planes, and the auxiliary levers 30, 31 and 32, 33 are separately rotatable about their axes 27' and 27'', and that the pivotal points of the levers engaging the same parallel guides lie at the same height.

In FIGS. 1 to 4, the auxiliary levers are all disposed on one side of the plane containing the axes of rotation 27 and 38. The apparatus according to the invention can however be further simplified and reduced in volume by disposing the auxiliary levers on both sides of said plane and providing that the parallel guides are displaceable in depth direction by means of a shear-like construction the pivotal points of which lie in the plane of the axes of rotation.

FIGS. 5 and 6 show the lever and guide system coordinated in the image space to one photogram in another embodiment of the invention, the remaining parts all corresponding to those referred to in connection wtih the first embodiment. To the other photogram is correlated an equal lever and guide system for producing the relations of image coordinates and space coordinates.

Two double levers 171 and 172 with slits 173 and 174, respectively, are rotatable one above another in different planes parallel to the drawing plane about a stationary axis 170 corresponding to the projection centre of one photogram. In a plane H—H which is parallel to the plane (not shown) containing the axes of rotation of the double levers correlated to each photogram, and which in FIG. 5 is at right angles to the plane of the drawing, the two double levers 171 and 172 have pivoted to them guides 179 and 180, respectively, by means of drive members 177 and 178 which are fast with slides 175 and 176 and engage the slits 173 and 174. The guides 179 and 180 are pivoted respectively to the slides 175 and 176, which glide along guides 181 and 182 lying in the plane H—H and parallel to the planes of rotation of the double levers 171, 172. Along the guides 179 and 180, at right angles to the plane H—H, are displaceable sliders 183 and 184, which engage drive members 185 and 186, respectively.

Two guides 188 and 189 are rotatable about the axis 187 through angles $\varphi_1$ and $\omega_1$, respectively, which can be adjusted relatively to the plane E—E at right angles to the plane H—H. The axis of rotation 187 lies in the plane E—E and is displaceable in a guide 213 in depth direction. Slides 190 and 191 displaceable respectively along guides 188 and 189 are provided with rods 192 and 193 on which glide the drive members 185 and 186. The rods 192 and 193 are at right angles to the guides 188 and 189 and parallel to the planes in which rotate the double levers 171 and 172. The slide 190 can be clamped to the guide 188 by means of a screw 194.

Between the slider 183 and the slide 191 is a follow-up control, the slider 183 having to this effect connected to it an electric contact element 195, which reacts on even the smallest changes in the position of the slider 183 in depth direction by producing electric pulses. These pulses are transmitted by a cable 196 to a motor 197 on the guide 189. The motor 197 rotates a spindle 198 which is disposed on the guide 189 and engages the slide 191.

For setting the affinity factor, the stationary axis of rotation 170 has pivoted to it the one end of a two-lozenge lazy-tongs made up of two double levers 199 and 200 and four single levers 201 to 204 and lying in a plane parallel to the planes of rotation of the double levers 171 and 172, the lazy-tongs serving as a gearing for stepping the affinity factor up and down. The one ends of the double levers 199 and 200 and the levers 201 and 202 have slits 205 to 208, respectively. The slits of the levers 201 and 202 by means of clamping screws 209 and 210, respectively, are connected to the slit ends of the double levers 199 and 200. The double levers 199 and 200 are rotatable about the axis 187 in the plane H—H, and their slitless ends are hinged to levers 203 and 204, respectively. The levers 203 and 204 by their ends remote from the double levers 199 and 200 influence a drive member 211 engaging a guide 212 which in its turn engages the drive member 186. The guides 181, 182 and 212 themselves are displaceable along stationary guides 214, 215, 216 and 217.

The ratio which the distance apart of the two axes 170 and 187 bears to the distance apart of the axis 187 and the drive member 211 can be changed as a function of the adjustment of the lazy-tongs at the slit ends of the levers. This means that the affinity factor can be altered, which in the present case is given by the ratio of the distance $k \cdot a$ of the two axes of rotation to the distance $a$ of the guide 212 from the plane H—H.

If correct adjustment has been obtained with respect to: the longitudinal inclination $\varphi_1$ by tilting the guide 188 away from the plane E—E, the transverse inclination $\omega_1$ by tilting the guide 189 away from the plane E—E, and the constant $c_K$ of the camera by displacement of the slide 190 along the guide 188, and if the lazy-tongs is correctly adjusted at the slitted ends coordinated to each other, then a tilting of the double levers 171 and 172 will be followed up by a displacement of the slides 175 and 176 along the guides 181 and 182 and a displacement of the sliders 183 and 184 along the guides 179 and 180. In this manner, the image coordinates $x$ and $y$ (not shown) of an image point of a corresponding vertical photogram are found as the distance of the guides 179 and 180, respectively, from the plane E—E. The magnitude of the displacement of the slider 183 in depth direction is transmitted over the electric contact element 195, the wire 196, the electric motor 197 and the spindle 198 to the slide 191, which in consequence is moved along the guide 189. The distance thus obtained of the guide 212 from the plane H—H is accordingly equal to the constant $c_K$ of the taking camera in respect of a vertical photogram of the image point corresponding to the coordinates $x$ and $y$.

For adjusting the affinity factor, a multi-stage or continuous transmission gear can be used instead of the lazy-tongs.

Moreover, it is possible exclusively to use electric calculating elements instead of the guides and slides correlated with the double levers 171 and 172.

We claim:

1. A photogrammetric apparatus for stereoscopic plotting of photograms lying in two planes at right angles to each other, comprising a stereo-comparator system having two carriers for each of two photograms and containing a binocular viewing system for plotting said photograms, said carriers and said viewing system being displaceable relatively to each other, a base plate, a cross-slide system disposed in the model space on said base plate and made up of three slides, said three slides being respectively displaceable in depth, breadth and height, said breadth and height slides being disposed on said depth slide and displaceable at right angles to the direction of motion of said depth slide, means for displacing said three slides, two double levers correlated to each of said photograms and rotatable about axes parallel to each other and at right angles to said base plate, the one of said double levers being pivoted to said breadth slide and the other of said double levers being pivoted to said height slide, the pivotal points of said breadth and height slides with said two double levers correlated to the right of said photograms being respectively displaceable in breadth and in depth direction, two first auxiliary levers being correlated in the image space to each of said double levers pivoted to said breadth slide, and being respectively rotatable about said axes of said double levers, the one of said first auxiliary levers and the double lever correlated to it enclosing an adjustable angle, two other auxiliary levers being correlated in the image space to each of said double levers pivoted to said height slide and being respectively rotatable about said axes of said double levers, said two other auxilary levers enclosing an adjustable angle, a system of five guides parallel to the breadth slide and disposed in parallel planes and correlated in the image space to each photogram, one of said guides at the moment of plotting being arrestable at such a distance from the axes of rotation of the respective levers as corresponds to the focal length at the moment of taking a photogram, the other four said guides being displaceable in depth direction, said double lever pivoted to said breadth slide and correlated to each photogram and said first auxiliary lever secured to it being respectively pivoted to the first and the second of said displaceable guides at distances corresponding to the focal length at the moment of taking a photogram, the securable auxiliary lever being pivoted to the third of said guides at a point lying in a plane at right angles to said guides, said plane containing the pivotal point of the not securable lever with the fourth of said guides, the not securable auxiliary lever being pivoted also to said arrestable fifth guide at a point effecting the relative movement in breadth direction of said photogram and said viewing system, said double lever pivoted to said height slide and correlated to each photogram being pivoted to said first displaceable guide at a point lying in a plane which is at right angles to said guides and contains the pivotal point of the one of said other auxiliary levers with the second displaceable guide, said two other auxiliary levers being respectively pivoted to the third and fourth of said displaceable guides at distances corresponding to the focal length at the moment of taking a photogram, and the other of said other auxiliary levers being pivoted also to said arrestable fifth guide at a point effecting the relative motion in depth direction of said photogram and said viewing system.

2. In a photogrammetric apparatus as claimed in claim 1, the axes of rotation of the levers correlated to one photogram coinciding with each other.

3. A photogrammetric apparatus for stereoscopic plotting of photograms lying in two planes at right angles to each other, comprising a stereo-comparator system having two carriers for each of two photograms and containing a binocular viewing system for plotting said photograms, said carriers and said viewing system being displaceable relatively to each other, a base plate, a cross-slide system disposed in the model space on said base plate and made up of three slides, said three slides being respectively displaceable in depth, breadth and height, said breadth and height slides being disposed on said depth slide and displaceable at right angles to the direction of motion of said depth slide, means for displacing said three slides, two double levers correlated to each of said photograms and rotatable about axes parallel to each other and at right angles to said base plate, the one of said double levers being pivoted to said breadth slide and the other of said double levers being pivoted to said height slide, the pivotal points of said breadth and height slides with said two double levers correlated to the right of said photograms being respectively displaceable in breadth and in depth direction, a first guide correlated to each double lever and rotatable about an axis lying together with the axes of rotation of said double levers in a plane at right angles to said breadth slide, a changeable step-up-and-down gearing between said axes of rotation, a first slide displaceable along said first guide and carrying a rail at right angles to said first guide, a second guide parallel to said breadth slide and displaceable at right angles to said breadth slide and rigidly connected to the axes of rotation of said first guide, a second slide displaceable on said second guide and pivoted to said double lever, a third guide extending in depth direction and fixed to said other slide, a slider displaceable along said third guide, a drive member rigidly connected to said slider and pivoted to said rail, an electric follow-up control correlated to each of said photograms, said electric follow-up control being disposed between said slider of said one double lever and said first slide correlated to said other double lever, and said slider being from said second slide of said one double lever at a distance equal to the distance of said first slide of the other double lever correlated to the same photogram from the axis of rotation of said first guide.

References Cited
UNITED STATES PATENTS 2,859,520 11/1958 Meijer _____ 33—1
3,026,766 3/1962 Preston _____ 33—1

WILLIAM D. MARTIN, Jr., *Primary Examiner.*
LEONARD FORMAN, *Examiner.*